United States Patent [19]

Kelly, III et al.

[11] 4,303,876
[45] Dec. 1, 1981

[54] MULTI-CELL BATTERY CHARGER

[75] Inventors: William T. Kelly, III, West Redding, Conn.; Francis Stahl, Rocky River, Ohio

[73] Assignee: Union Carbide Corporation, New York, N.Y.

[21] Appl. No.: 134,494

[22] Filed: Mar. 27, 1980

[51] Int. Cl.³ .................... H02J 7/00; H01M 10/46
[52] U.S. Cl. .................................. 320/2; 320/3; 320/5; 320/15
[58] Field of Search ................ 320/2, 15, 3–5

[56] References Cited

U.S. PATENT DOCUMENTS 3,579,075  5/1971  Floyd ........................ 320/15 X
4,101,818  7/1978  Kelly et al. .................. 320/2

Primary Examiner—Robert J. Hickey
Attorney, Agent, or Firm—Cornelius F. O'Brien

[57] ABSTRACT

A multi-cell battery charger having a cell holder adapted for receiving and charging various size rechargeable cells, such as cylindrical and rectangular shaped rechargeable cells.

12 Claims, 10 Drawing Figures

MULTI-CELL BATTERY CHARGER

FIELD OF THE INVENTION

The invention relates to a multi-cell battery charger having a battery holder adapted to accommodate for charging two "D" size cylindrical cells, two "C" size cylindrical cells, two or four "AA" size cylindrical cells or a 9-volt rectangular cell.

BACKGROUND OF THE INVENTION

Rechargeable cells, such as the nickel-cadmium cells, have a relatively constant potential during discharge and can be recharged many times, thus extending their useful life. In general, any secondary or rechargeable cell contains a combination of active materials which can be electrolytically oxidized and reduced repeatedly. In rechargeable cells, reactions at both electrodes are reversible and the input of current in the appropriate direction from an outside source will reverse the discharge reaction and, in effect, recharge the electrodes.

The rechargeable cells have been used in various type devices, such as toys, calculators, radios and other types of power-operated devices. Many of the power-operated devices on the market today have been designed to accommodate cylindrical cells of the "AA", "C", and "D" size or the 9-volt rectangular cell. The cylindrical sizes have now become standard-type cell sizes having overall dimensions which can be found in various publications, such as The American National Standard Specifications For Dry Cell Batteries—ANSI C18.1-1969 published by the American National Standards Institute, Inc., New York, N.Y.

There are many different types of chargers on the market which employ standard transformer and half-wave or full-wave rectifier circuit means for providing a direct current for charging rechargeable type cells or batteries. The cell holders of the chargers are generally designed to accommodate a single size cell. Recently, cell holders have been designed which can accommodate two or more standard size cells through the use of adapters. For example, one cell holder is designed to accommodate "D" size cells and, in addition, comes equipped with a hollow "D" size shell into which a "C" size cell can be placed. The hollow shell is constructed such that the terminals of the "C" size cell are electronically contacted to terminals on the shell thereby providing the inner cell with an outer "D" size shell configuration. Thus the "C" size cell can be charged in the "D" size cell adapter.

U.S. Pat. No. 4,101,818 in the name of William T. Kelly III and Francis Stahl discloses a multi-cell battery charge that is constructed to accommodate either "D" size, "C" size or "AA" size cells, but not combinations of these size cells at the same time. The charger of this disclosure does not require any adapter for charging the various size cells.

One of the objects of this invention is to provide an improvement over the multi-cell battery charger disclosed in U.S. Pat. No. 4,101,818 by providing selective recessing of the terminal members to insure that the charger will only operate when the cells are inserted in the proper direction.

Another object of this invention is to provide a multi-cell charger that does not require any adapter for charging cylindrical "AA", "C", or "D" size cells, or standard 9-volt rectangular cells measuring about 1 inch wide by 0.7 inch thick and 1.9 inch high.

The foregoing and additional objects will become more fully apparent from the following description and the accompanying drawings.

SUMMARY OF THE INVENTION

The invention relates to a battery charger comprising a holder having a generally rectangular base with a pair of upstanding first and second side walls, an upstanding front wall and an upstanding rear wall; a first conductive terminal contact means having a first upstanding conductive terminal member disposed adjacent to and interior of the first side wall and a second upstanding conductive terminal member disposed adjacent to and interior of the rear wall; a second conductive terminal contact means having a first upstanding conductive terminal member disposed adjacent to and interior of the second side wall and a second flexible upstanding conductive terminal member disposed adjacent to and interior of the rear wall; a third conductive terminal contact means having two upstanding conductive terminal members disposed adjacent to and interior of the front wall; said second conductive terminal member of the first conductive terminal contact means and said second terminal member of the second conductive terminal contact means aligned substantially in the same plane and spaced apart from the conductive terminal members of the third terminal contact means by a distance to accommodate lengthwise a "D" size [about 2.25 inches (5.7 cm)] rechargeable cell in pressure contact therebetween; said first conductive terminal member of the first conductive terminal contact means disposed and spaced apart from said first conductive terminal member of the second conductive terminal contact means by a distance to accommodate two tandem series-connected "AA" size or "C" size [about 1.8 inches (4.8 cm)] rechargeable cells in pressure contact therebetween; said first conductive terminal contact means and said second conductive terminal contact means connected across a transformer and current rectifier adapted for plugging into a conventional alternating-current power supply line; the improvement wherein the first terminal member of the first contact means is recess mounted in the first side wall and the second terminal member of the first contact means is recess mounted in the rear wall; wherein the first terminal member of the second contact means projects from the second side wall and the second terminal member of the second contact means projects from the rear wall; and wherein one first terminal member of the third contact means is disposed opposite the second terminal member of the first contact means and projects from the front wall, and the second terminal member of the third contact means is disposed opposite the second terminal member of the second contact means and is recess mounted in the front wall.

The invention also relates to a battery charger comprising a holder having a generally rectangular base with a pair of upstanding first and second side walls, an upstanding front wall and an upstanding rear wall; a first conductive terminal contact means having a first upstanding conductive terminal member disposed adjacent to and interior of the first side wall and a second upstanding conductive terminal member disposed adjacent to and interior of the rear wall; a second conductive terminal contact means having a first upstanding conductive terminal member disposed adjacent to and interior of the second side wall and a second upstanding conductive terminal member disposed adjacent to and interior of the rear wall; a third conductive terminal contact means having two upstanding conductive terminal members disposed adjacent to and interior of the front wall; said second conductive terminal member of the first conductive terminal contact means and said second terminal member of the second conductive terminal contact means aligned substantially in the same plane and spaced apart from the conductive terminal members of the third terminal contact means by a distance to accommodate lengthwise a "D" size [about 2.25 inches (5.7 cm)] rechargeable cell in pressure contact therebetween; said first conductive terminal member of the first conductive terminal contact means disposed and spaced apart from said first conductive terminal member of the second conductive terminal contact means by a distance to accomodate two tandem series-connected "AA" size or "C" size [about 1.8 inches (4.8 cm)] rechargeable cells in pressure contact therebetween; said first conductive terminal contact means and said second conductive terminal contact means connected across a transformer and current rectifier adapted for plugging into a conventional alternating-current power supply line; the improvement wherein the first conductive terminal contact means has a first snap battery terminal disposed in the base and wherein a second snap battery terminal in electrical contact with the second conductive terminal contact means is disposed adjacent to and spaced apart from the first snap battery terminal by about 0.5 inch (about 1.07 cm), and preferably said first and second snap battery terminals being disposed substantially in alignment with the terminal members adapted to accommodate a D-size rechargeable cell.

The base of the battery charger could be provided with upstanding projected members to define a pair of traverse grooves to accommodate two parallel aligned "D" size rechargeable cells, the first traverse groove being disposed proximal to and in parallel alignment with the first side wall and the second groove being disposed proximal to and in parallel alignment with the second side wall; a pair of longitudinal grooves to accommodate two tandem series-connected "AA" size cells, the first longitudinal groove being disposed proximal to and in parallel alignment with the front wall and the second longitudinal groove being disposed proximal to and in parallel alignment with the rear wall; and an axially disposed longitudinal groove to accommodate two tandem series-connected "C" size rechargeable cells.

The pair of longitudinal grooves could be designed with a small width transverse semi-circular projection slightly off mid-center to prevent the charging of "AA" and "C" size cells placed into the charger in the inverse position.

In the charging of a pair of "AA" size cells, it is preferable to have a resistive element, such as a 47 ohm resistor in series with the cells so as to limit the charging current fed to the cells. In a like manner, in the charging of a 9-volt rectangular battery, it is preferable to have a resistive element, such as a 180-ohm resistor in series with the cell so as to limit the charging current fed to the cell. Thus a rectified power source could provide a fixed current for charging "C" and "D" size cells while the inclusion of a resistive element in series with the "AA" size cells and a 9-volt rectangular cell could effectively decrease the charging current for these small capacity cells.

The battery charger of this invention will become apparent from the following description in conjunction with the accompanying drawing which is set forth as being exemplary of an embodiment of the present invention wherein.

DETAILED DESCRIPTION OF THE DRAWING

Figure 1:
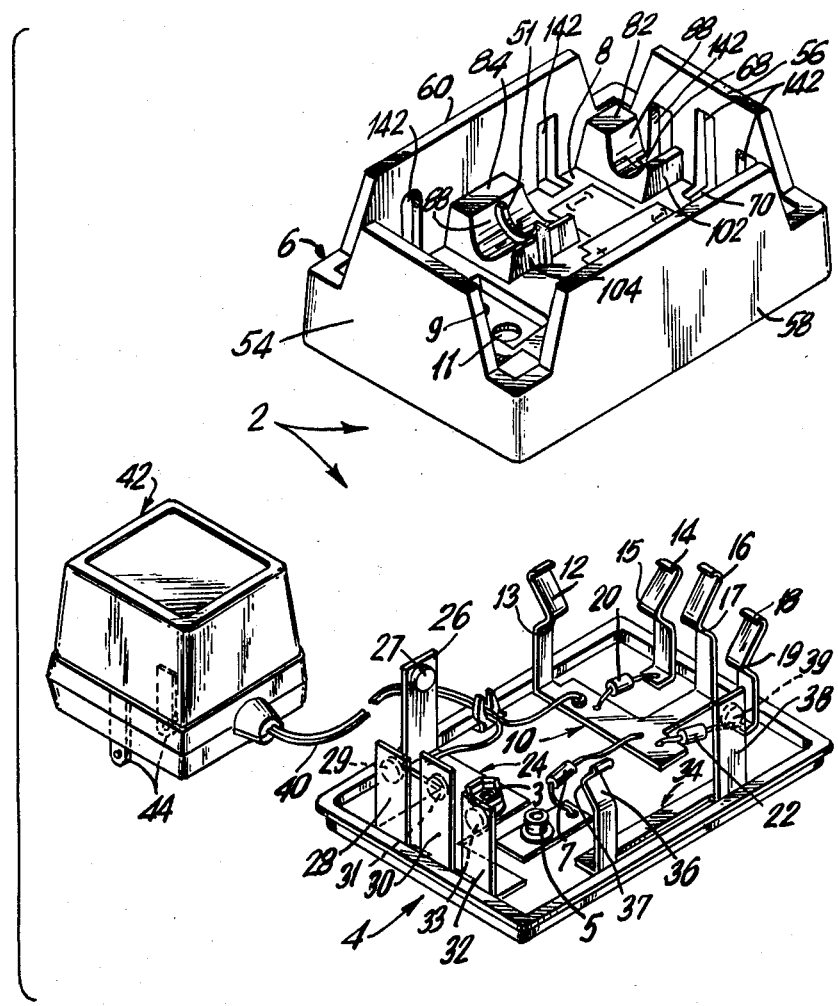
FIG. 1 is an exploded perspective view of the battery holder coupled to a plug-in rectifier means in accordance with the present invention.
Figure 8:
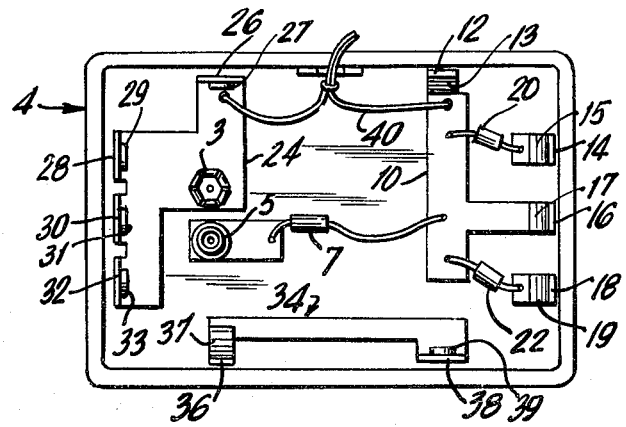
FIG. 8 is a plan view of the lower base of the battery holder of FIG. 1 showing the terminal contact means.

In FIG. 1 there is shown a battery holder 2 comprising a sub-base member 4 and housing 6, said sub-base member 4 designed to seat fixedly onto a flange on the upper base 8 of housing 6. Secured to the sub-base member 4 as shown in FIGS. 1 and 8 is a first terminal contact 10 having an upstanding flexible terminal member 12 disposed proximal the rear edge and terminal members 14, 16 and 18 disposed proximal the side edge. Terminal members 14 and 18 are not electronically connected directly to terminal contact 10 but, instead, each is connected to terminal contact 10 via current limiting resistor 20 and 22, respectively. A second terminal contact 24 is secured to the sub-base 4 and has an upstanding flexible terminal member 26 disposed proximal the rear edge, and upstanding flexible terminal members 28, 30, 32 disposed proximal the opposite side edge. A third terminal contact 34 is secured to the sub-base 4 and has upstanding flexible terminal members 36 and 38 disposed proximal the front edge. The terminal contacts 10, 24 and 34 could be made of any suitable conductive spring material, such as nickel-plated spring brass, nickel-plated copper, tin-plated copper, cadmium-plated copper, etc.

Terminal members 26, 28, 30, 32 and 38 (FIG. 8) have flat circular projections 27, 29, 31, 33 and 39, respectively, which are designed to be recess mounted in the walls of housing 6. Terminal members 12, 14, 16, 18 and 36 have "V" shaped projections 13, 15, 17, 19 and 37, respectively, which are designed to project from the walls of housing 6. Terminal member 26 has disposed on its base a female snap battery terminal 3 with the male snap battery terminal 5 spaced apart sufficient to accommodate a standard 9-volt rectangular battery. A resistor 7 electronically connects terminal 10 to snap battery terminal 5.

Figures 9, 10:
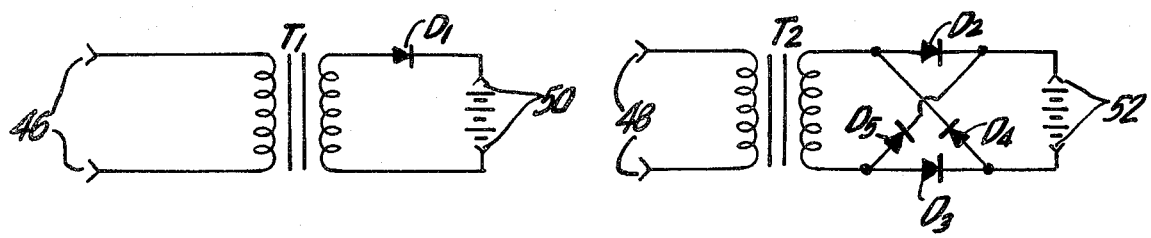
FIG. 9 is a schematic view of a transformer and half-wave rectifier which can be used in this invention.
FIG. 10 is a schematic view of a transformer and full-wave rectifier which can be used in this invention.

Terminal contacts 10 and 24 are electronically connected via wire 40 across a conventional type rectifier 42 which is adapted through male plug 44 for coupling to a conventional alternating current power source. The rectifier could comprise a transformer $T_1$ coupled to a half-wave rectifier $D_1$ as shown in FIG. 9 or a transformer $T_2$ coupled to a full-wave bridge $D_2$ to $D_5$ rectifier as shown in FIG. 10. The terminals 46 and 48 of FIGS. 9 and 10, respectively, would correspond to the terminals of plug 44 shown in FIG. 1. The terminals 50 and 52 of FIGS. 9 and 10, respectively, would correspond to terminal contacts 10 and 24 shown in FIG. 1.

Housing 6 shown in FIGS. 1 through 6 comprises an upper base 8 having upstanding terminal support side walls 54 and 56, an upstanding terminal support front wall 58, and an upstanding terminal support rear wall 60. In the upper base 8 proximal the first side wall 54 are disposed three openings 62, 64 and 66 which are spaced apart so as to accommodate the upstanding terminal members 28, 30 and 32, respectively, recessed in wall 54 when the sub-base 4 is fixedly seated onto the flange of the underside of upper base 8. In a like manner, the upper base 8 has openings 68, 70, and 72 proximal the second side wall 56 to accommodate terminal members 14, 16 and 18, respectively; openings 74 and 76 proximal the rear wall 60 to accommodate terminal members 26 and 12, respectively; and openings 78 and 80 proximal the first wall 58 to accommodate terminal members 36 and 38, respectively. Terminals 26 and 38 would be recess mounted within the walls while terminals 12, 14, 16, 18 and 36 would project from the walls. Disposed in base 8 ae two circular apertures 9 and 11 to accommodate snap terminals 3 and 5, respectively.

Figure 2:
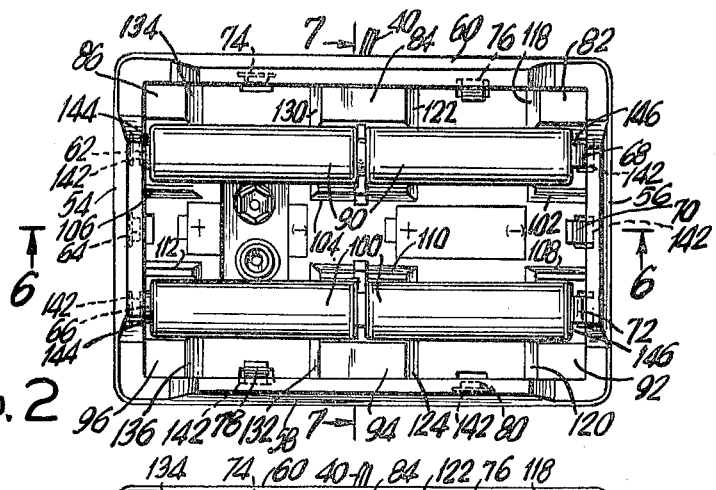
FIG. 2 is a plan view of the battery holder of FIG. 1 showing two pairs of series connected "AA" size rechargeable cells in position for receiving a charge.
Figure 7:
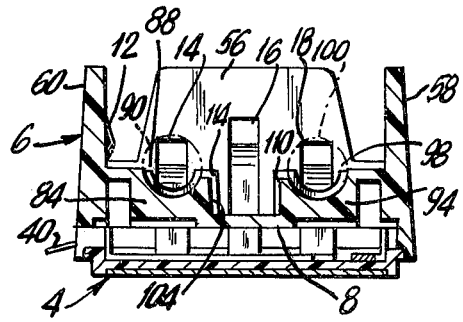
FIG. 7 is a transverse cross-sectional view of FIG. 2 taken along line 7—7.

Three spaced apart and axially aligned blocks 82, 84 and 86, each having a cylindrical recess, project from upper base 8 proximal the rear wall 60. The longitudinal groove 88 formed by the cylindrical recesses in members 82, 84 and 86 defines a trough or recess for accommodating two tandem series-connected "AA" size cells 90 as shown in FIG. 2. In a like manner, spaced apart and aligned blocks 92, 94 and 96, each having a cylindrical recess, project from upper base 8 proximal the first wall 58 to form a longitudinal groove 98 for accommodating two tandem series-connected "AA" size cells 100 (FIGS. 2 and 7). Blocks 84 and 94 have an arcuate projection 51 and 53, respectively, which will prevent electronic contact between the "AA" cells and "C" cells if they are inserted in the charger in the reverse position.

Figure 3:
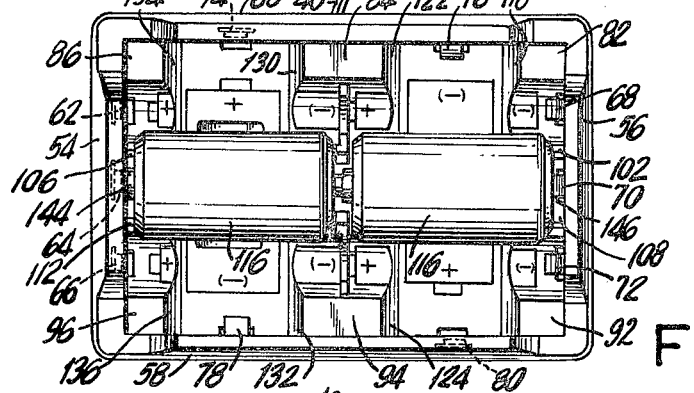
FIG. 3 is a plan view of the battery holder of FIG. 1 showing a pair of series connected "C" size rechargeable cells in position for receiving a charge.
Figure 6:
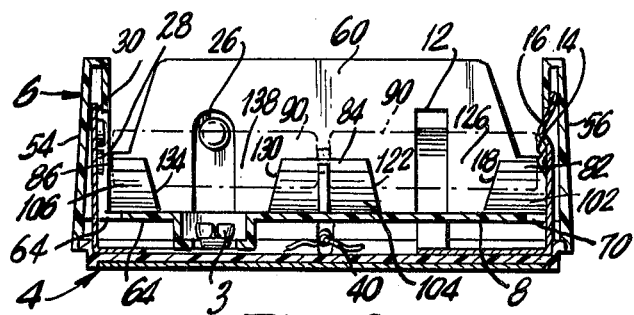
FIG. 6 is a longitudinal cross-sectional view of FIG. 2 taken along line 6—6.

The three aligned block members 82, 84 and 86 are transversely spaced from the three aligned block members 92, 94 and 96 so that their inner upstanding wall members 102, 104, 106, 108, 110 and 112, respectively, which are smaller in height than the opposite wall members defining longitudinal grooves 88 and 98, define a center longitudinal groove or cavity 114 to accommodate two tandem series-connected "C" size cells 116 as shown in FIG. 3 The "C" cells need not seat within longitudinal groove 114 completely so that they touch upper base 8 but, instead, the cells could rest on wall members 102, 104, 106, 108, 110 and 112 such that a portion of each of their outer extremities would extend into groove 114. An advantage in having the "C" size cells resting on the closely-spaced wall members is that the "C" cells could then overlap and project onto the space allotted for the "AA" size thereby preventing the simultaneous insertion of both the "C" size and "AA" size cells into the holder As shown in FIGS. 1 and 6, terminal members 16 and 30 are positioned higher from the upper base 8 than terminal members 14, 18, 28 and 32 to insure that when two tandem series-connected "AA" size cells are placed into grove 114, they will be disposed below terminal members 16 and 30, thus preventing contact with the terminal members 16 and 30. This will insure that the "AA" size cells will only be charged when disposed in grooves 88 and 98, said grooves containing terminal members 14 and 18, respectively, which are connected to limiting resistors 20 and 22, respectively. Thus this will provide a fail-safe feature whereby the current for charging the "AA" size cells will be reduced by the current limiting resistors 20 and 22 as described above.

Each of the block members 82 and 92 has a tapered wall 118 and 120, respectively, which is spaced apart from the tapered walls 122 and 124 of block members 84 and 94, respectively, to define a first transverse groove 126 for accommodating a first "D" size cell 128 as shown in FIGS. 2 through 6. In a similar manner, the opposite tapered walls 130 and 132 of block members 84 and 94, respectively, are spaced apart from tapered walls 134 and 136 of block members 86 and 96, respectively, to define a second transverse groove 138 for accommodating a second "D" size cell 140. As is apparent from FIGS. 4, 6 and 7, when the "D" size cells 128 and 140 are placed into the charge holder, they overlap grooves 88, 98 and 114, thereby preventing the insertion of the "AA" size, "C" size cells, and 9-volt cell, when the "D" cells are being charged.

Another feature of the present invention is that when the "AA" size or "C" size cells are being charged, grooves 126 and 138 (FIG. 6) provide recesses on both sides at the midsection of the "AA" size or "C" size cells (FIGS. 2 and 3) which can be used to facilitate the grasping and removal of the cells from the charge. In a similar manner, when the "D" size cells are assembled in the battery charger, groove 114 provides recesses on both sides at the midsection of the "D" size cells which can be used to facilitate the grasping and removal of said "D" size cells.

Figure 4:
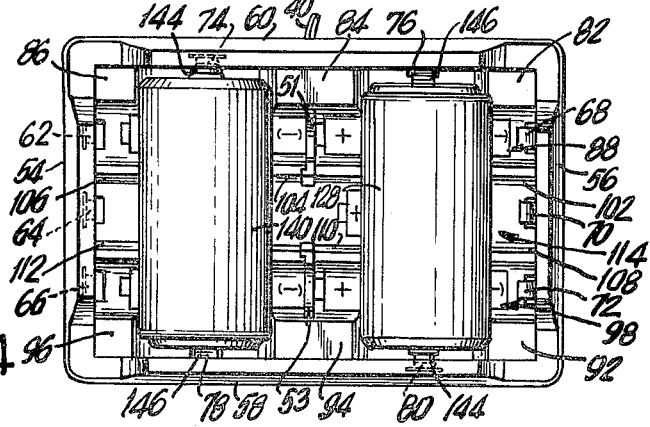
FIG. 4 is a plan view of the battery holder of FIG. 1 showing a pair of "D" size cells in position for receiving a charge.
Figure 5:
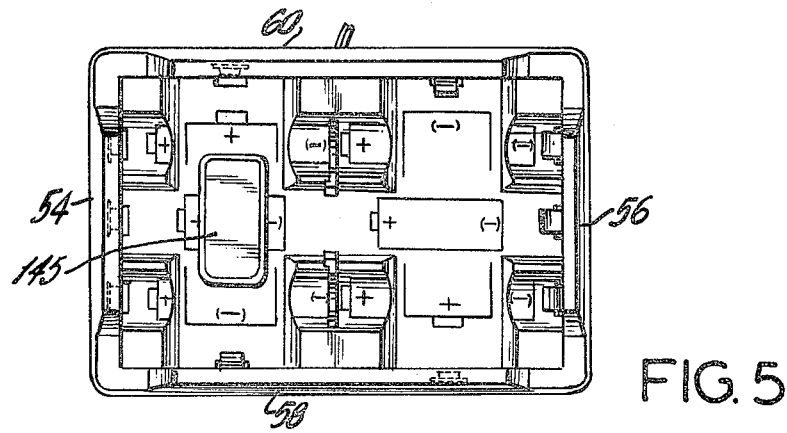
FIG. 5 is a plan view of the battery holder of FIG. 1 showing a 9-volt rectangular cell in position for receiving a charge.

As shown in FIGS. 1 to 4, the internal walls 54, 56, 58 and 60 of holder 6 can be fabricated with grooves or cavities 142 disposed adjacent the openings 62–80 in upper base 8. Each groove 142 is dimensionally sized to accommodate and provide support for the respective upstanding terminal members of terminal contacts 10, 24 and 34. The "AA" size cylindrical cell [1⅞ inches long (4 74 cm) by 17/32 inch diameter [1.35 cm], the "C" size cylindrical cell [1–13/16 inches long (4.6 cm) by 15/16 inch diameter (2.38 cm)] and the "D" size cylindrical cell [2¼ inches long (5.7 cm) by 1¼ inches diameter (3.17 cm)] all are fabricated with a projected center-disposed position terminal 144 and a flat disc-shaped negative terminal 146 as shown in FIGS. 2 through 4. Consequently, the upstanding terminals 12, 14, 16, 18 and 36, which are the negative terminals of the charger, are "V" shaped so as to insure pressure contact with the disc-shaped negative terminals 146 of the cells. The remaining upstanding terminals 26, 28, 30, 32 and 38, which are the positive terminals of the charger, are shaped in a flattened circular configuration and are recess mounted in grooves 142 whereupon the positive center terminal 144 of the cells projects into the grooves 142 making good electronic pressure contact with the terminals recessed therein.

The snap battery terminals 3 and 5 shown aligned in a "D" battery groove, accommodate a 9-volt rectangular cell 145 for charging as shown in FIG. 5 and again will prevent the insertion of any other cell for charging.

Holder 6 of the charger could be molded or otherwise fabricated using a suitable plastic material, such as polyolefin, polyethylene, polypropylene, copolymers of acrylonitrile, butadiene or styrene, or any other suitable material capable of supporting the cells to be charged and withstanding normal handling and use without breaking.

Alternative embodiments and modes of practicing the invention, but within its spirit and scope, will, in the light of this disclosure, occur to persons skilled in the art. It is intended, therefore, that this description be taken as illustrative only and not be construed in any limiting sense.

What is claimed is:

1. A battery charger comprising a holder having a generally rectangular base with a pair of upstanding first and second side walls, an upstanding front wall and an upstanding rear wall; a first conductive terminal contact means having a first upstanding conductive terminal member disposed adjacent to and interior of the first side wall and a second upstanding conductive terminal member disposed adjacent to and interior of the rear wall; a second conductive terminal contact means having a first upstanding conductive terminal member disposed adjacent to and interior of the second side wall and a second upstanding conductive terminal member disposed adjacent to and interior of the rear wall; a third conductive terminal contact means having two upstanding conductive terminal members disposed adjacent to and interior of the front wall; said second conductive terminal member of the first conductive terminal contact means and said second terminal member of the second conductive terminal contact means aligned substantially in the same plane and spaced apart from the conductive terminal members of the third terminal contact means by a distance to accommodate lengthwise a "D" size [about 2.25 inches (5.7 cm)] recharageable cell in pressure contact therebetween; said first conductive terminal member of the first conductive terminal contact means disposed and spaced apart from said first conductive terminal member of the second conductive contact means by a distance to accommodate two tandem series-connected "AA" size or "C" size [about 1.8 inches (4.8 cm)] rechargeable cells in pressure contact there-between; said first conductive terminal contact means and said second conductive terminal contact means connected across a transformer and current rectifier adapted for plugging into a conventional alternating-current power supply line; the improvement wherein the first conductive terminal contact means has a first snap battery terminal disposed in the base and wherein a second snap battery terminal in electrical contact with the second conductive terminal contact means is disposed adjacent to and spaced apart from the first snap battery terminal by about 0.5 inch (about 1.07 cm) to accommodate a 9-volt rectangular rechargeable cell for charging.

2. The battery charger of claim 1 wherein the base is provided with upstanding projected members to define a pair of transverse grooves to accommodate two parallelly aligned "D" size recharageable cells, the first transverse groove being disposed proximal to and in parallel alignment with the first side wall and the second groove being disposed proximal to and in parallel alignment with the second side wall; a pair of longitudinal grooves to accomodate two tandem series-connected "AA" size cells, the first longitudinal groove being disposed proximal to and in parallel alignment with the front wall and the second longitudinal groove being disposed proximal to and in parallel alignment with the rear wall; and an axially disposed longitudinal groove to accommodate two tandem series-connected "C" size rechargeable cells.

3. The battery charger of claim 2 wherein each of the longitudinal grooves is defined by three axially spaced-apart members having substantially cylindrical recesses to accommodate the width of an "AA" size cell, the first member being spaced apart from the third member by a distance sufficient to accommodate the width of a "D" size cell therebetween; and wherein the inner walls of said members proximal the longitudinal center axis of the holder are spaced apart sufficiently to define the axially disposed longitudinal groove.

4. The battery charger of claim 2 wherein the first upstanding conductive terminal member of the first conductive terminal contact means comprises three separate upstanding terminals, each of which is aligned at one end of one of the longitudinal grooves; wherein the first upstanding conductive terminal member of the second conductive terminal contact means comprises three separate upstanding terminals, each of which is aligned at the opposite end of one of the longitudinal grooves; wherein each of the upstanding conductive terminal members of the third conductive terminal contact means is aligned at one end of one of the transverse grooves; wherein the second upstanding conductive terminal member of the first conductive terminal contact means is aligned at the opposite end of one of the transverse grooves; and wherein the second upstanding conductive terminal member of the second conductive terminal contact means is aligned at the opposite end of the other transverse groove.

5. The battery charger of claim 4 wherein a first resistive element is connected in series between the second conductive terminal contact means and the upstanding terminal member of said second conductive terminal contact means disposed in alignment with one of the pair of longitudinal grooves, and a second resistive element is connected in series between the second conductive terminal contact means and the upstanding terminal member of said second conductive terminal contact means disposed in alignment with the other of the pair of longitudinal grooves.

6. The battery charger of claim 1, or 5 wherein a resistive element is connected in series between the second conductive terminal means and the second snap battery terminal.

7. A battery charger comprising a holder having a generally rectangular base with a pair of upstanding first and second side walls, an upstanding front wall and an upstanding rear wall; a first conductive terminal contact means having a first upstanding conductive terminal member disposed adjacent to and interior of the first side wall and a second upstanding conductive terminal member disposed adjacent to and interior of the rear wall; a second conductive terminal contact means having a first upstanding conductive terminal member disposed adjacent to and interior of the second side wall and a second flexible upstanding conductive terminal member disposed adjacent to and interior of the rear wall; a third conductive terminal contact means having two upstanding conductive terminal members disposed adjacent to and interior of the front wall; said second conductive terminal member of the first conductive terminal contact means and said second terminal member of the second conductive terminal contact means aligned substantially in the same plane and spaced apart from the conductive terminal members of the third terminal contact means by a distance to accommodate lengthwise a "D" size [about 2.25 inches (5.7 cm)] rechargeable cell in pressure contact therebetween; said first conductive terminal member of the first conductive terminal contact means disposed and spaced apart from said first conductive terminal member of the second conductive terminal contact means by a distance to accommodate two tandem series-connected "AA" size or "C" size [about 1.8 inches (4.8 cm)] rechargeable cells in pressure contact therebetween; said first conductive terminal contact means and said second conductive terminal contact means connected across a transformer and current rectifier adapted for plugging into a conventional alternating-current power supply line; the improvement wherein the first terminal member of the first contact means is recess mounted in the first side wall and the second terminal member of the first contact means is recess mounted in the rear wall; wherein the first terminal member of the second contact means projects from the second side wall and the second terminal member of the second contact means projects from the rear wall; wherein one terminal member of the third contact means is disposed opposite the second terminal member of the first contact means and projects from the front wall; the second terminal member of the third contact means is disposed opposite the second terminal member of the second contact means and is recess mounted in the front wall, and wherein the first conductive terminal contact means has a first snap battery terminal disposed in the base and wherein a second snap battery terminal in electrical contact with the second conductive terminal contact means is disposed adjacent to and spaced apart from the first snap battery terminal by about 0.5 (about 1.07 cm) to accommodate a 9-volt rectangular rechargeable cell for charging.

8. The battery charger of claim 1 wherein a resistive element is connected in series between the second conductive terminal contact means and the second snap battery terminal.

9. The battery charger of claim 7 wherein the base is provided with upstanding projected members to define a pair of transverse grooves to accommodate two parallelly aligned "D" size rechargeable cells, the first transverse groove being disposed proximal to and in parallel alignment with the first side wall and the second groove being disposed proximal to and in parallel alignment with the second side wall; a pair of longitudinal grooves to accommodate two tandem series-connected "AA" size cells, the first longitudinal groove being disposed proximal to and in parallel alignment with the front wall and the second longitudinal groove being disposed proximal to and in parallel alignment with the rear wall; and an axially disposed longitudinal groove to accommodate two tandem series-connected "C" size rechargeable cells.

10. The battery charger of claim 9 wherein each of the longitudinal grooves is defined by three axially spaced-apart members having substantially cylindrical recesses to accommodate the width of an "AA" size cell, the first member being spaced apart from the third member by a distance sufficient to accommodate the width of a "D" size cell therebetween; and wherein the inner walls of said members proximal the longitudinal center axis of the holder are spaced apart sufficiently to define the axially disposed longitudinal groove.

11. The battery charger of claim 9 wherein the first upstanding conductive terminal member of the first conductive terminal contact means comprises three separate upstanding terminals, each of which is aligned at one end of one of the longitudinal grooves; wherein the first upstanding conductive terminal member of the second conductive terminal contact means comprises three separate upstanding terminals, each of which is aligned at the opposite end of one of the longitudinal grooves; wherein each of the upstanding conductive terminal members of the third conductive terminal contact means is aligned at one end of one of the transverse grooves; wherein the second upstanding conductive terminal member of the first conductive terminal contact means is aligned at the opposite end of one of the transverse grooves; and wherein the second upstanding conductive terminal member of the second conductive terminal contact means is aligned at the opposite end of the other transverse groove.

12. The battery charger of claim 11 wherein a first resistive element is connected in series between the second conductive terminal contact means and the upstanding terminal member of said second conductive terminal contact means disposed in alignment with one of the pair of longitudinal grooves, and a second resistive element is connected in series between the second conductive terminal contact means and the upstanding terminal member of said second conductive terminal contact means disposed in alignment with the other of the pair of longitudinal grooves.

* * * * *

UNITED STATES PATENT AND TRADEMARK OFFICE
CERTIFICATE OF CORRECTION

PATENT NO. : 4,303,876
DATED : December 1, 1981
INVENTOR(S) : William T. Kelly, III and Francis Stahl It is certified that error appears in the above—identified patent and that said Letters Patent is hereby corrected as shown below:

Column 7, line 46, after the word "conductive" add
-- terminal --.
Column 9, line 43, delete "1" and substitute therefor
-- 7 --.

Signed and Sealed this

Seventh Day of September 1982

[SEAL]

Attest:

GERALD J. MOSSINGHOFF

Attesting Officer  Commissioner of Patents and Trademarks